May 4, 1937.   J. NORINSBERG ET AL   2,079,330
KNOCK-DOWN FRUIT CRATE
Filed July 6, 1935   2 Sheets-Sheet 1
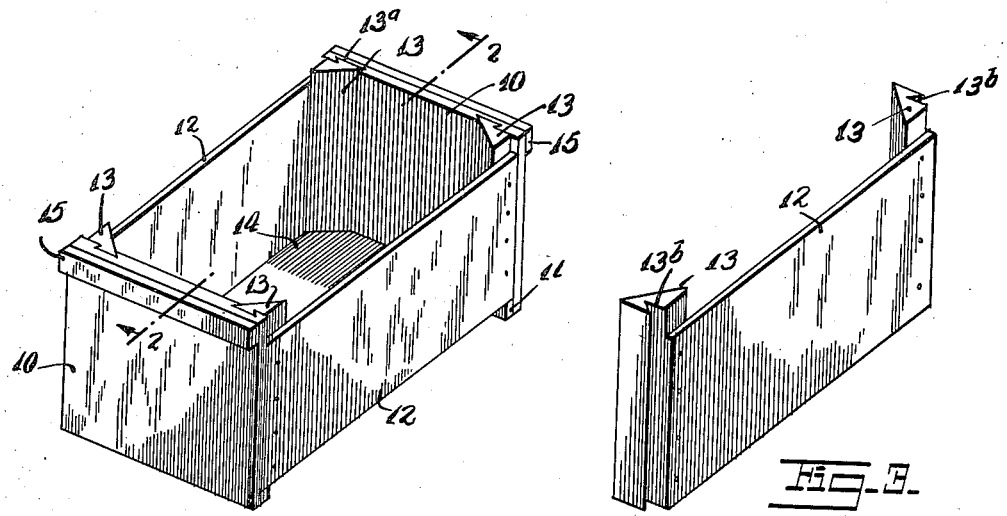
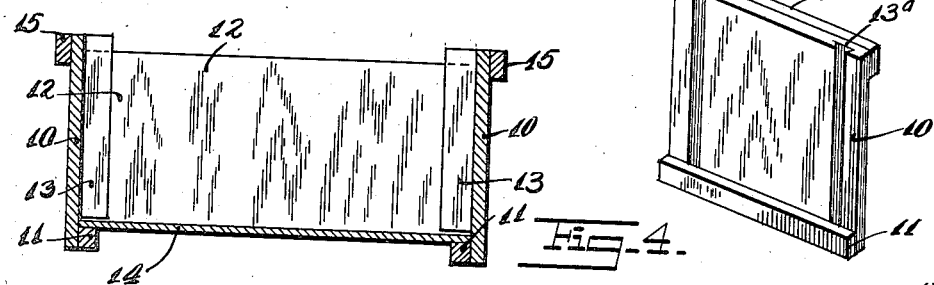
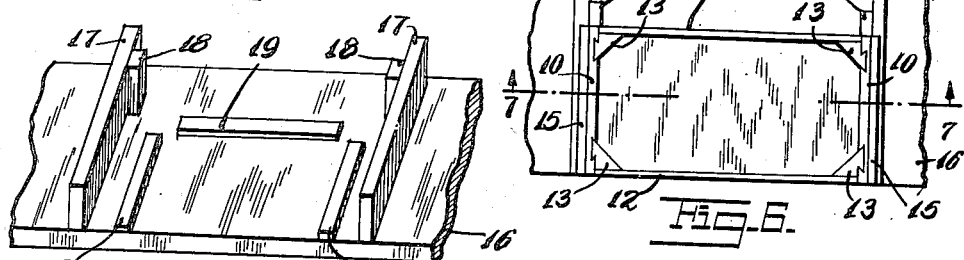
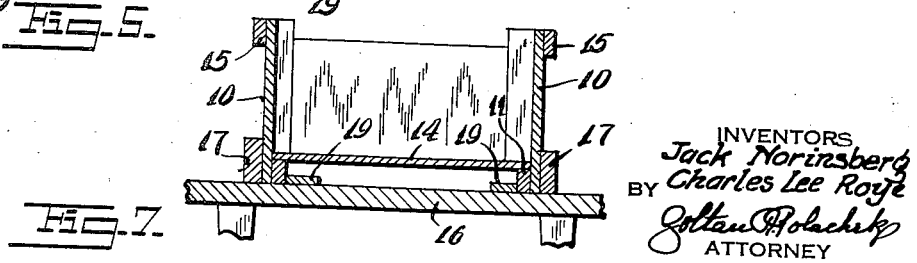
INVENTORS
Jack Norinsberg
Charles Lee Roye
BY
Zoltan Polachek
ATTORNEY May 4, 1937.                J. NORINSBERG ET AL                2,079,330
                            KNOCK-DOWN FRUIT CRATE
                            Filed July 6, 1935              2 Sheets-Sheet 2

INVENTORS
Jack Norinsberg
BY Charles Lee Roye
ATTORNEY

Patented May 4, 1937

2,079,330

UNITED STATES PATENT OFFICE 2,079,330

KNOCK-DOWN FRUIT CRATE

Jack Norinsberg and Charles Lee Roye, Brooklyn, N. Y.

Application July 6, 1935, Serial No. 30,052

3 Claims. (Cl. 217—12)

This invention relates to new and useful improvements in a knock-down fruit crate.

The invention has for an object the construction of an article as mentioned which is characterized by the fact that the component thereof may be easily assembled and knocked down, without the use of nails, staples or other holding elements.

The invention has specific reference to an arrangement wherein the bottom walls of the crates are efficiently held in position.

Still further the invention contemplates the use of key strips attached on the ends of the side walls and engageable with grooves along the side portions of the end walls to hold the walls together, and the bottom edges of the key strips resting against the top of the bottom wall to hold it against transverse displacement.

Still further the invention also proposes the bottom wall of each crate to rest freely on side strips attached upon the end walls and in which the side walls extend over the side edges of the bottom wall to hold it against lateral displacement.

Still further the invention proposes an arrangement wherein the side walls extend past the edges of the end walls.

Another one of the objects of this invention is to make provision whereby bottom walls of different sizes may be substituted in each of the crates.

Another object of the invention is the construction of an article as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a crate constructed according to this invention.

Fig. 2 is a longitudinal vertical sectional view taken on the line 2—2 of Fig. 1.

Fig. 3 is a perspective view of one of the side walls of the crate.

Fig. 4 is a perspective view of one of the end walls of the crate.

Fig. 5 is a perspective view of a jig by which the crates may be easily assembled.

Fig. 6 is a plan view of Fig. 5 with a crate shown in position.

Fig. 7 is a longitudinal sectional view taken on the line 7—7 of Fig. 6.

Figure 8:
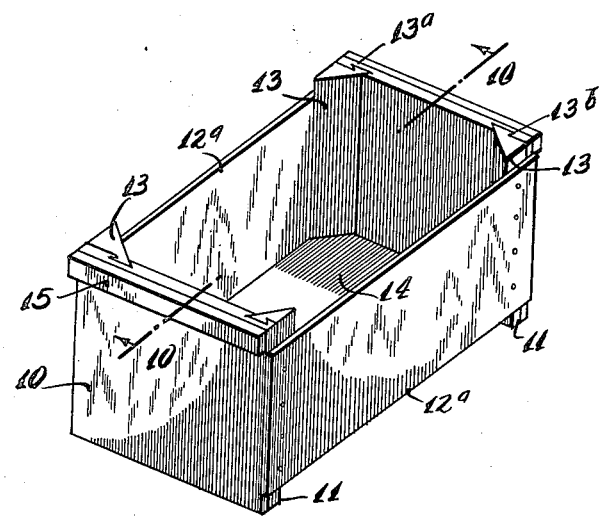
Fig. 8 is a perspective view of a crate constructed according to another embodiment of this invention.

The separable fruit crate, according to this invention, comprises a pair of spaced end walls 10 having strips 11 along the bottom inner edges thereof. Side walls 12 extend between the end walls.

Key strips 13 are attached on the ends of the side walls and are engageable with grooves 13$^a$ along the side portions of the end walls to hold the walls together. A bottom wall 14 is freely rested upon the strips 11 and held against displacement in a simple, efficient manner. The side walls 12 extend over the side edges of the bottom wall 14 to hold it against lateral displacement, and the lower end of the key strips 13 rest on the top face of the bottom wall to hold it against transverse displacement, and the grooves 13$^a$ are slightly tapered so that when the crate is assembled, during the first part of the assembly the bottom wall 14 is loosely held, but at the completion of the assembly of members 10 and 12, the bottom wall 14 is firmly gripped.

Grip elements 15 are attached along the top edges of the outer sides of the end walls 12. The key grooves 13$^a$ extend from the top edge of the end walls to a small distance above the top of the strips 11. The purpose of terminating the grooves above the strips 11 is that the grooves need extend no further downwards than the top face of the bottom wall 14, and it is cheaper to terminate the grooves as soon as possible.

The key strips 13 are substantially of right triangular form with the right angle arranged in the corner between the side and end walls. Each hypothenuse continues into one side of the tongue portion of each key strip, which engages the 45° grooves 13a. The other sides of the tongue portions are formed by recessed areas 13b of 45°, (see Fig. 3). The ends of the side walls 12 are flush with the bases of the recesses 13b so that when the box is assembled the edges of the end walls 10 are exposed, as clearly shown in Fig. 1. Fig. 2 clearly shows the key strips terminating slightly above the top face of the bottom wall 14.

In Figs. 5–7 inclusive a jig is shown to assist in the assembling of the crates. This jig comprises a bottom board 16. A pair of spaced transverse boards 17 are attached thereon and are equipped with blocks 18 against which the edges of the end walls may be engaged when the outer faces of the end walls are placed in intimate contact with the inner faces of the board 17.

Strips 19 are attached upon the board 16. Certain of the strips 19 are located so as to be in intimate contact with the inner faces of the strips 11. The box may be easily assembled by standing up the end walls 10, placing the bottom wall 14 in position, and engaging the side walls 12 between the end walls. The side walls should be slipped downwards from the top so that the key strips engage the grooves 13a.

Figure 9:
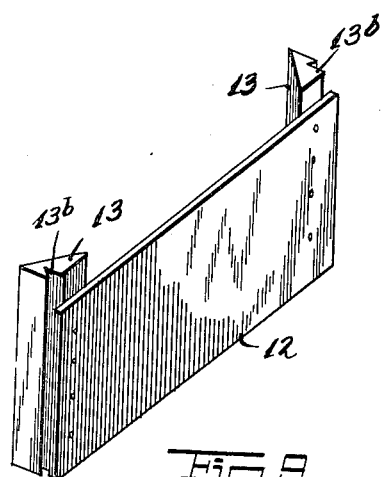
Fig. 9 is a perspective view of one side wall of the crate.
Figure 10:
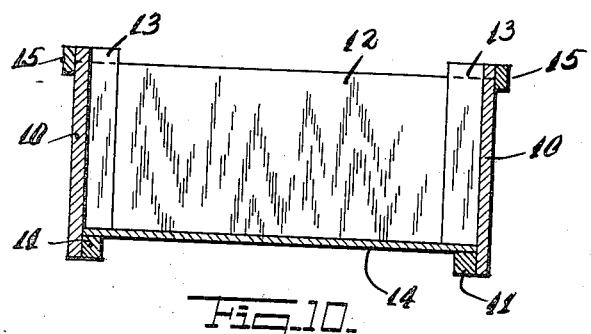
Fig. 10 is a longitudinal sectional view on the line 10—10 of Fig. 8.
Figure 11:
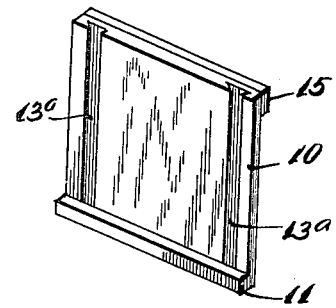
Fig. 11 is a perspective view of one end wall of the crate.

In Figs. 8–11 inclusive another embodiment of the invention is disclosed which is very similar to the previous form, except for the fact that the crate has side walls 12a which are slightly longer than the walls 12 so as to extend over the edges of the end walls 10. In Fig. 9 another side wall is shown in detail and attention is particularly called to the fact that there are small portions which project past the key strips 13. It is these portions which engage over the edges of the end walls.

Figure 12:
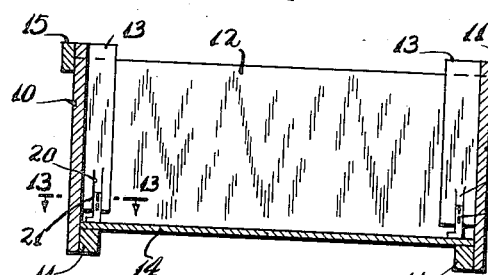
Fig. 12 is a longitudinal sectional view of a crate constructed according to another embodiment of this invention.
Figures 13, 14:
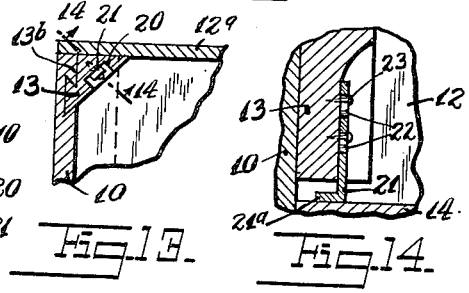
Fig. 13 is a fragmentary horizontal sectional view taken on the line 13—13 of Fig. 12.
Fig. 14 is a fragmentary sectional view taken on the line 14—14 of Fig. 13.

In Figs. 12–14 inclusive a still further modified embodiment of the invention is disclosed in which provision is made for accommodating bottom walls of different thicknesses to the crate. More particularly, each of the key strips 13 is formed with a groove 20 at its bottom on the outer face thereof extending vertically upwards. Within each groove there is a foot 21 which has vertical slots 22 through which nails 23 engage. The nails hold the feet in fixed positions.

It is possible to slightly loosen the nails and shift the feet as desired. The lower ends of the feet 21 have bent portions 21a which are adapted to engage the top face of the bottom wall.

It is to be understood that the quality of wood, their sizes and proportion may be changed as desired.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A collapsible fruit crate, comprising a pair of spaced end walls having strips along the bottom inner edges thereof, side walls to extend between the end walls, key strips attached on the end of the side walls and engaging with grooves along the side portions of said end walls to hold the walls together, a bottom wall freely resting on said side strips, the side walls extending over the side edges of the bottom wall to hold it against lateral displacement, lower edges of the key strips resting against the top of the bottom wall to hold it against transverse displacement, and members adjustably mounted on the key strips for engaging against the top face of the bottom wall, each key strip being formed with a vertical recess in which the member engages, each member having longitudinal slots through which nails pass and by which the member is adjustably mounted.

2. A collapsible fruit crate, comprising a pair of spaced end walls having strips along the bottom inner edges thereof, side walls to extend between the end walls, key strips attached on the end of the side walls and engaging with grooves along the side portions of said end walls to hold the walls together, a bottom wall freely resting on said side strips, the side walls extending over the side edges of the bottom wall to hold it against lateral displacement, lower edges of the key strips resting against the top of the bottom wall to hold it against transverse displacement and members adjustably mounted on the key strips for engaging against the top face of the bottom wall, each key strip being formed with a vertical recess in which the member engages, each member having longitudinal slots through which nails pass and by which the member is adjustably mounted, and the bottom portions of the members being turned under and adapted to engage the bottom wall.

3. A collapsible fruit crate, comprising a pair of spaced end walls having strips along the bottom inner edges thereof, side walls to extend between the end walls, key strips attached on the end of the side walls and engaging with grooves along the side portions of said end walls to hold the walls together, a bottom wall freely resting on said side strips, the side walls extending over the side edges of the bottom wall to hold it against lateral displacement, a means on said key strips for accommodating bottom walls of different thicknesses, comprising L-shaped members adjustably mounted in vertical recesses formed in said key strips and adapted to engage against the top face of the bottom wall, and nails adapted to engage through longitudinal slots formed in said L-shaped members to adjustably hold said L-shaped members on said key strips.

JACK NORINSBERG.
CHARLES LEE ROYE.